May 30, 1939.　　　E. ROGGENSTEIN　　　2,160,171
CARD PUNCH
Filed Nov. 4, 1937　　14 Sheets-Sheet 2

INVENTOR
E. ROGGENSTEIN

BY *H. A. Sparks*
ATTORNEY

May 30, 1939.  E. ROGGENSTEIN  2,160,171
CARD PUNCH
Filed Nov. 4, 1937   14 Sheets-Sheet 4

INVENTOR
E. ROGGENSTEIN
BY W. A. Spark
ATTORNEY

May 30, 1939.  E. ROGGENSTEIN  2,160,171
CARD PUNCH
Filed Nov. 4, 1937    14 Sheets-Sheet 6

INVENTOR
E. ROGGENSTEIN
BY N. A. Sparks
ATTORNEY

May 30, 1939.  E. ROGGENSTEIN  2,160,171
CARD PUNCH
Filed Nov. 4, 1937    14 Sheets-Sheet 7

INVENTOR
E. ROGGENSTEIN
BY W. A. Spark
ATTORNEY

May 30, 1939.  E. ROGGENSTEIN  2,160,171
CARD PUNCH
Filed Nov. 4, 1937    14 Sheets-Sheet 8
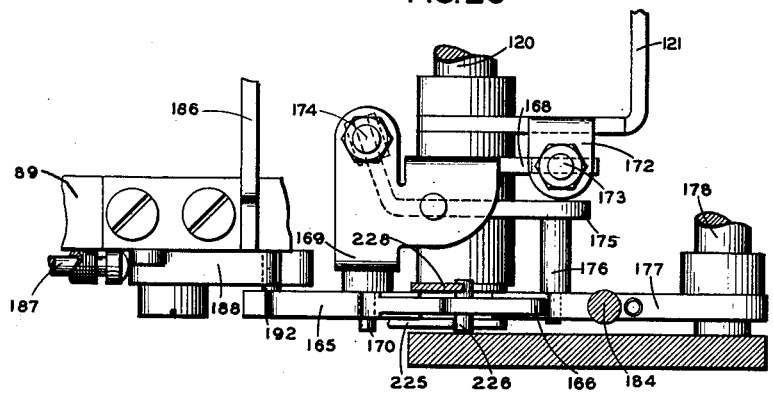
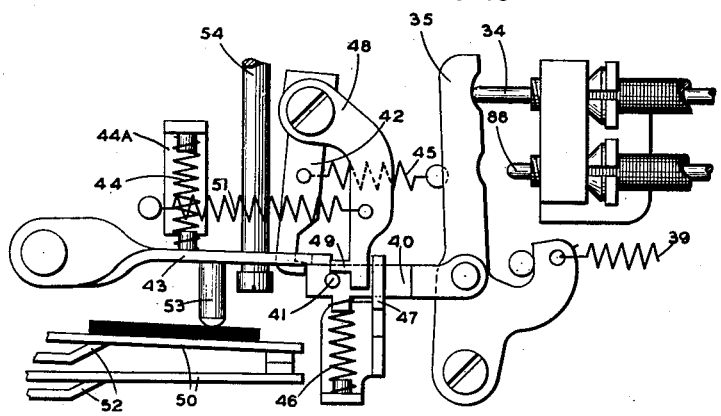
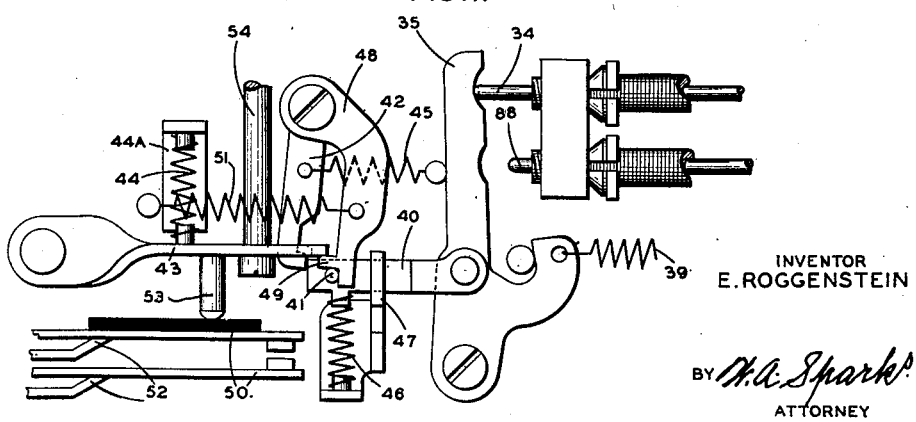
INVENTOR
E. ROGGENSTEIN
BY
ATTORNEY May 30, 1939.  E. ROGGENSTEIN  2,160,171
CARD PUNCH
Filed Nov. 4, 1937   14 Sheets-Sheet 9

INVENTOR
E. ROGGENSTEIN

BY H. A. Sparks
ATTORNEY

May 30, 1939.  E. ROGGENSTEIN  2,160,171
CARD PUNCH
Filed Nov. 4, 1937   14 Sheets-Sheet 10
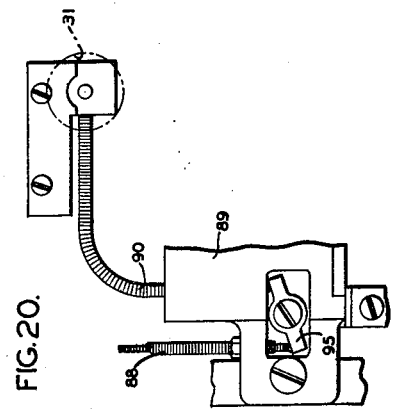
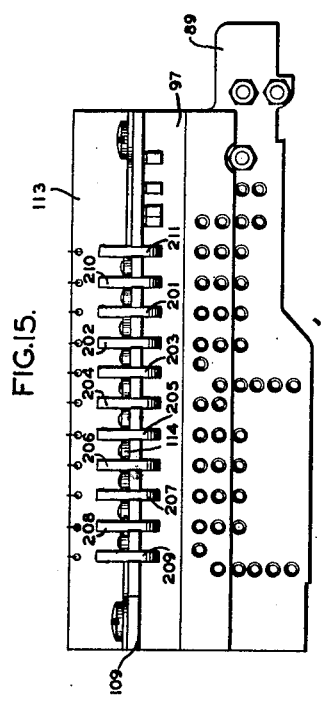
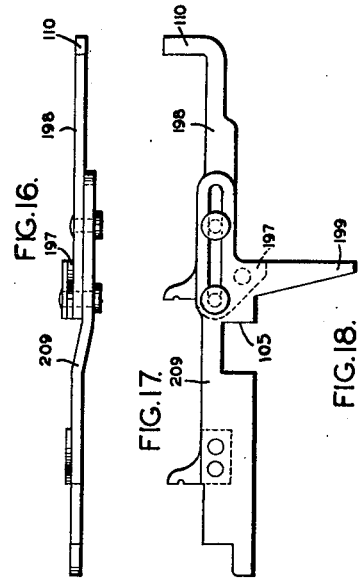
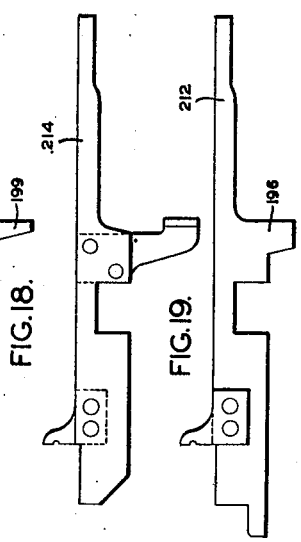
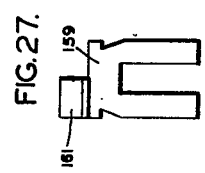
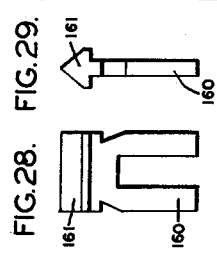
INVENTOR
E. ROGGENSTEIN
BY W. A. Sparks
ATTORNEY May 30, 1939.　　E. ROGGENSTEIN　　2,160,171
CARD PUNCH
Filed Nov. 4, 1937　　14 Sheets-Sheet 11
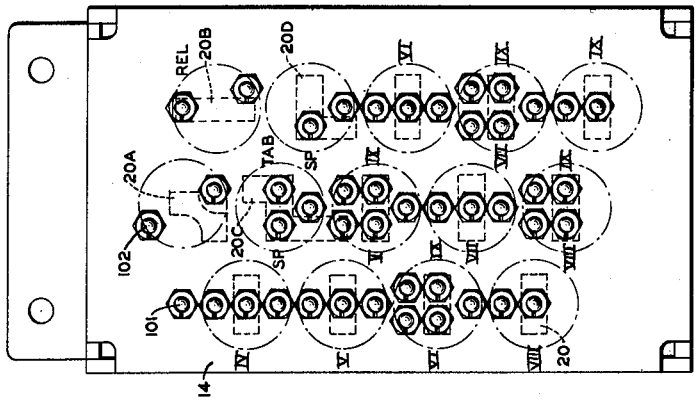
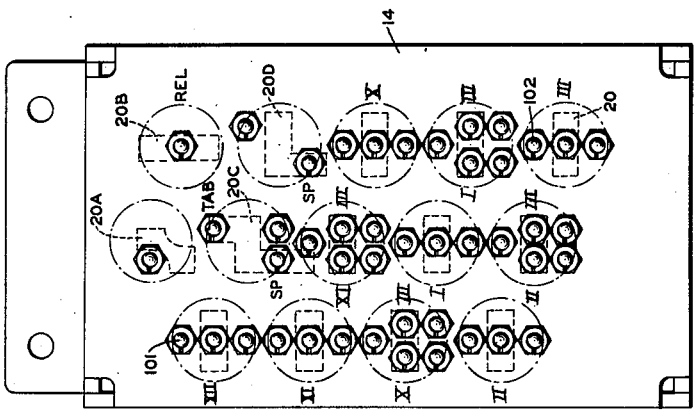
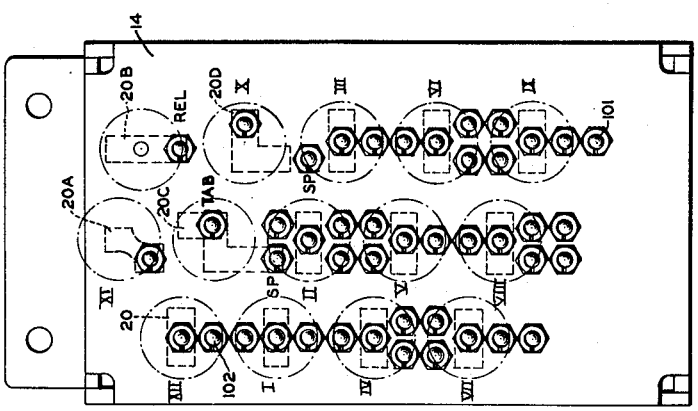
INVENTOR
E. ROGGENSTEIN
BY W. A. Sparks
ATTORNEY May 30, 1939.   E. ROGGENSTEIN   2,160,171
CARD PUNCH
Filed Nov. 4, 1937   14 Sheets-Sheet 12

INVENTOR
E. ROGGENSTEIN
BY W. A. Sparks
ATTORNEY

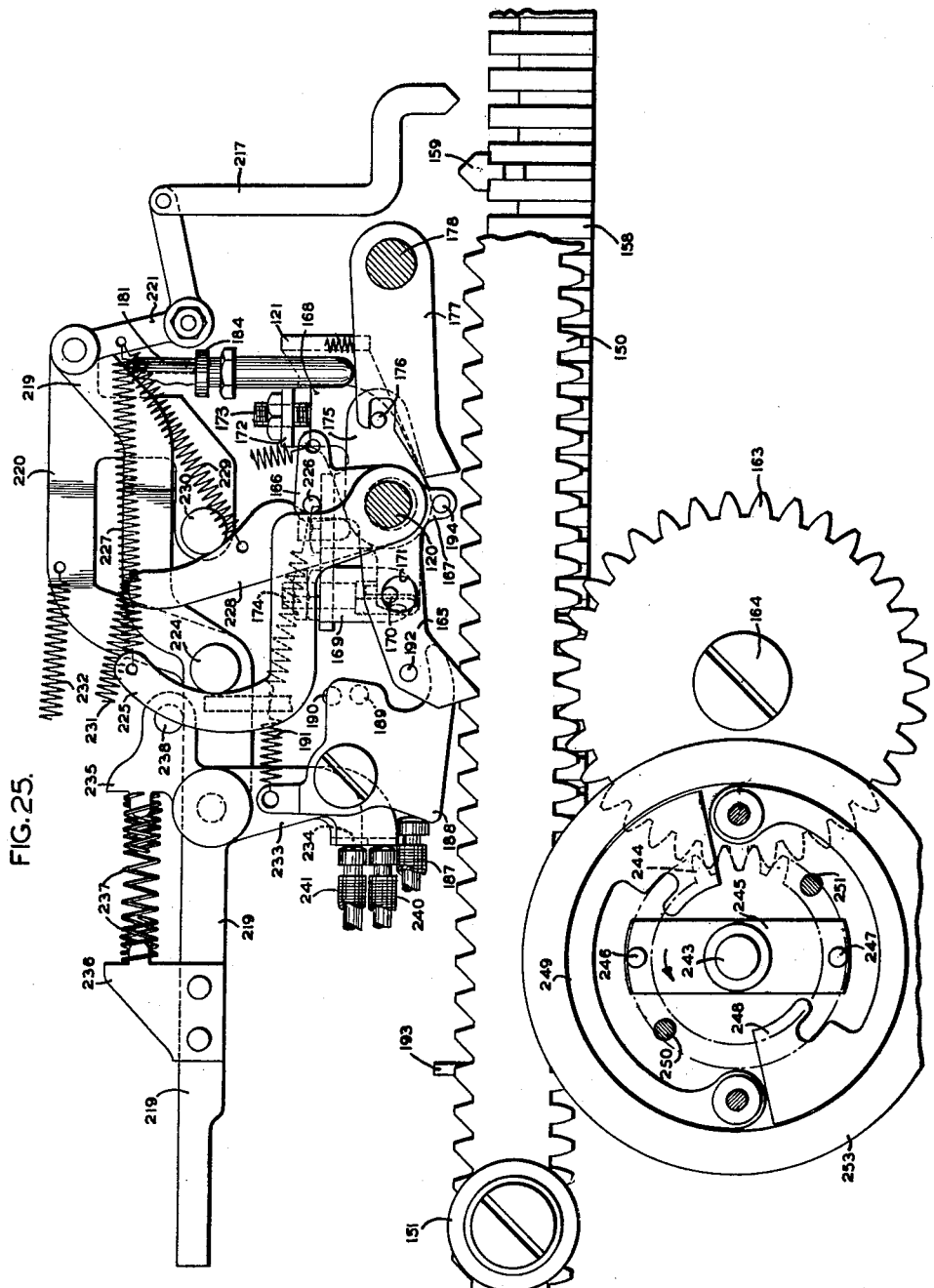

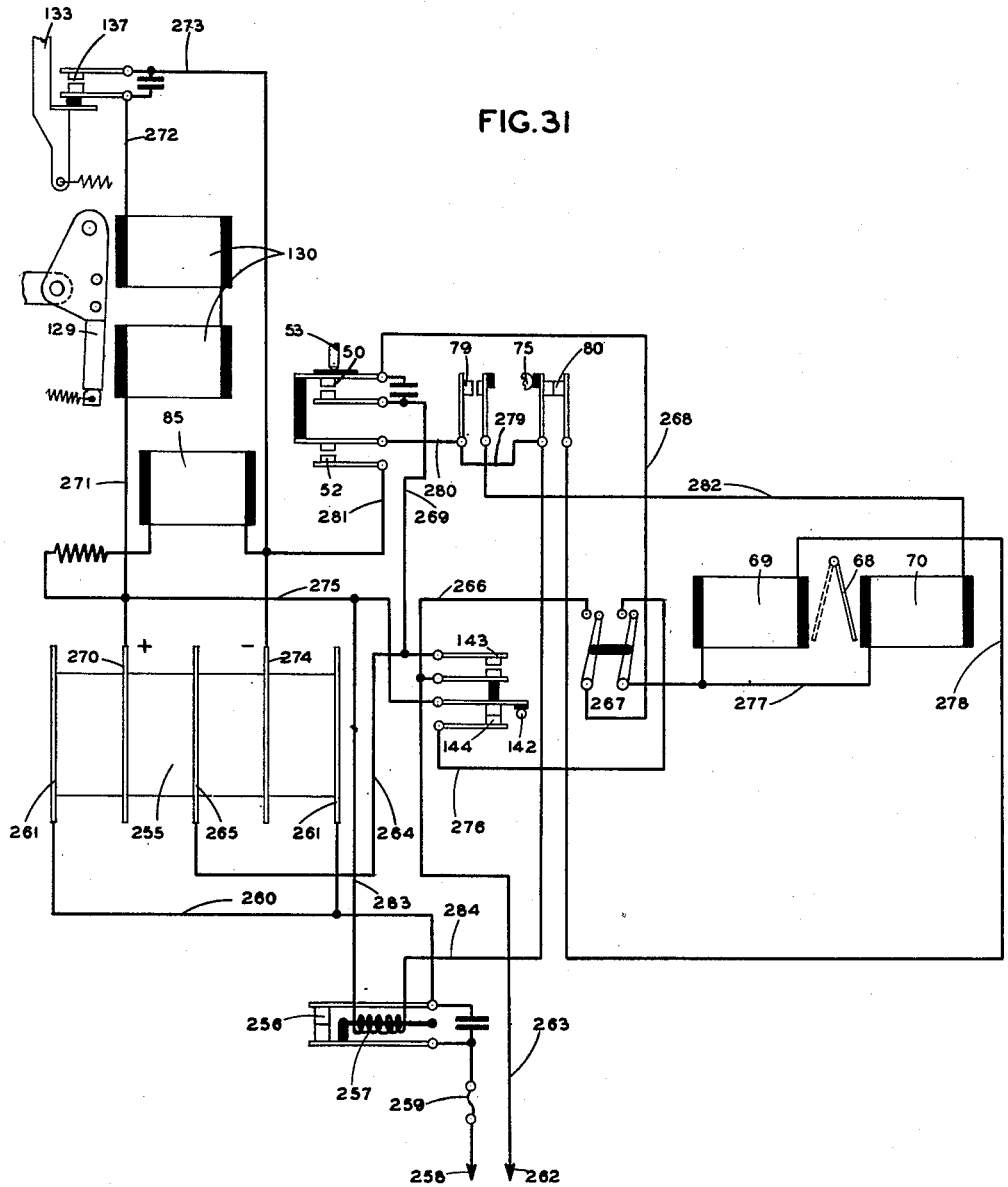

Patented May 30, 1939

2,160,171

UNITED STATES PATENT OFFICE 2,160,171

CARD PUNCH

Edwin Roggenstein, Ilion, N. Y., assignor to Remington Rand Inc., Buffalo, N. Y., a corporation of Delaware Application November 4, 1937, Serial No. 172,703

21 Claims. (Cl. 164—113)

This invention relates generally to machines for perforating cards for use in statistical machines and more particularly to an electro-mechanically operated punch mechanism adapted to perforate data selectively in one of a plurality of codes at the will of the operator, the invention being particularly applied to machines adapted to perforate the card column by column.

As is well known, the Powers type of statistical machines uses two types of cards, one of which contains forty-five columns in which there are twelve index positions, the data being perforated in a single hole code wherein each digit is represented by one hole, the value of which is determined by its respective index position. The other type of card contains ninety columns; forty-five in an upper zone or half of the card, and forty-five in a lower zone. The data in this type of card is perforated in a code using six index positions, the odd digits being represented by one perforation and the even by a combination of an odd perforation and the "nine" perforation. Both cards and codes are described and disclosed in the patent to W. W. Lasker, No. 2,044,708, issued June 16, 1936.

The present machine is provided with a single keyboard which may be shifted manually from a position to control forty-five column code punching to one for controlling the punching in the ninety-column upper zone and which is electrically shifted from the upper ninety-column position to the lower column position by a key under control of the operator. While the keyboard is in position to perforate the lower columns of the card, the depression of this same key serves to shift the keyboard back to the upper column position and additional controlling mechanism actuated by the card carriage is provided for shifting the keyboard from upper to lower position or vice versa. Interlocking means is provided for disabling the "upper-lower" shift when the keyboard is in the 45-column position and for disabling the "45-upper" shift when the keyboard is in the lower 45-column position. A switch is also provided for disabling the card carriage shifting when it is desired to punch a succession of cards in either the upper or lower ninety-column zone to the exclusion of the other.

The machine is also provided with an escapement mechanism which controls the movement of the card carriage from column to column, tabulating means for controlling the movement of the carriage from field to field, which fields may be differently arranged in either of the two zones of the ninety-column card and release mechanism for disabling the escapement mechanism so that the carriage may be moved to a position to permit the removal of the card from the machine.

The punches are operated from the keyboard through the medium of a series of interponent slides which are selectively interposed between their respective punches and an electrically operated hammer bail. The movement of the keyboard positions the keys over a plurality of flexible connections for selectively controlling the positioning of the interponent slides. The interponents cooperate with a bail member adapted to close contacts for controlling the escapement mechanism to cause the carriage to step one step for each perforation. A space key is provided which mechanically controls a holding pawl in the above escapement mechanism. A release key is provided which disables both the ratchet pawl and holding pawl of the escapement mechanism, thus permitting the carriage to be released and moved to an extreme ineffective position. A tabulator key is provided which permits the carriage to skip to an adjacent tabulator stop. Among the digit keys the "11" key is effective only when the keyboard is in the 45-column code position. With the keyboard in either of the ninety-column positions, it is automatically shifted to the other position when the carriage reaches its extreme effective position. Each key position causes the card carriage to advance the card one column by means of a spacing mechanism.

Heretofore it has been the practice when using alternating current for operating electrically driven punches to provide a rectifier which, due to its size, was of necessity located outside the machine. It is apparent that this arrangement was undesirable.

In the present machine a compact and efficient rectifier is provided which is located in the base of the machine, thereby increasing the portability of the machine and avoiding the necessity of providing an external device for use with the machine. My copending application S. N. 101,903, filed September 22, 1936, explains the principle of the rectifier which has been modified for use in the present punch.

It is, therefore, the principal object of this invention to provide a card punch which is entirely portable and operable by either alternating or direct current for perforating cards in either a forty-five or ninety column code.

Another object is to provide an electrically controlled mechanism to shift the keyboard from a position for perforating in the upper ninety-column code to one in which lower ninety-column code may be perforated, and vice versa.

Another object is to provide means for shifting the keyboard manually from the forty-five column to upper ninety column position and vice versa.

A further object is to provide means for preventing the shifting of the keyboard while a key is depressed, or the operation of any of the keys during a shift of the keyboard.

A still further object is to provide an escapement mechanism for advancing the card carriage one step, the total distance of card travel, or any part of the upper or lower zones thereof.

An additional object is to provide a braking device for partially arresting the travel of the card carriage after the escapement mechanism has released the carriage.

Another object is to provide electrical means for preventing the shifting of the keyboard from upper ninety to lower ninety column position when punching is to be confined to one of the two zones.

A more clear conception of the operation, construction, and further objects of the invention may be had from the following specification taken in conjunction with the accompanying drawings in which:

Figs. 1 and 2 combined form a front elevation of the machine; which has been tipped backward to reveal the mechanism in the base;

Figs. 3 and 4 combined form a plan view of the machine showing the keyboard, the card carriage, and associated controls;

Figs. 10 and 11 are detail views of a portion of the mechanism of Fig. 6 shown in different degrees of operation;

Fig. 15 is a right-hand elevation of the connection block for the ends of the Bowden wires showing the ends of the interponent slides and their associated ball lock mechanism;

Fig. 16 is a plan view of a "three" or a "nine" interponent slide;

Fig. 17 is a front elevation of Fig. 16;

Fig. 18 is a detail view of the "Space" interponent slide;

Fig. 19 is a detail view of the "Twelve" interponent slide;

Fig. 20 is a detail view of the Bowden wire connections for the manual shift key;

Fig. 21 is a plan view of the connector plate for the Bowden wires located below the keyboard, the key actuator blocks being shown in their forty-five column position;

Fig. 22 is similar to Fig. 21 and shows the key actuator blocks in their upper ninety-column position;

Fig. 23 is similar to Fig. 21 and shows the key actuator blocks in their lower ninety-column position;

Fig. 25 is an enlarged detail view of the escapement mechanism and controls therefor;

Fig. 26 is a plan view of a portion of Fig. 25, disclosing the escapement mechanism;

Fig. 27 is an enlarged view of a tabulator stop for use in ninety-column work;

Fig. 28 is an enlarged view of a tabulator stop for use in forty-five column work;

Fig. 29 is a side elevation of Fig. 28;

Fig. 31 is a diagram of the electrical operating circuit of the machine.

Figure 1:
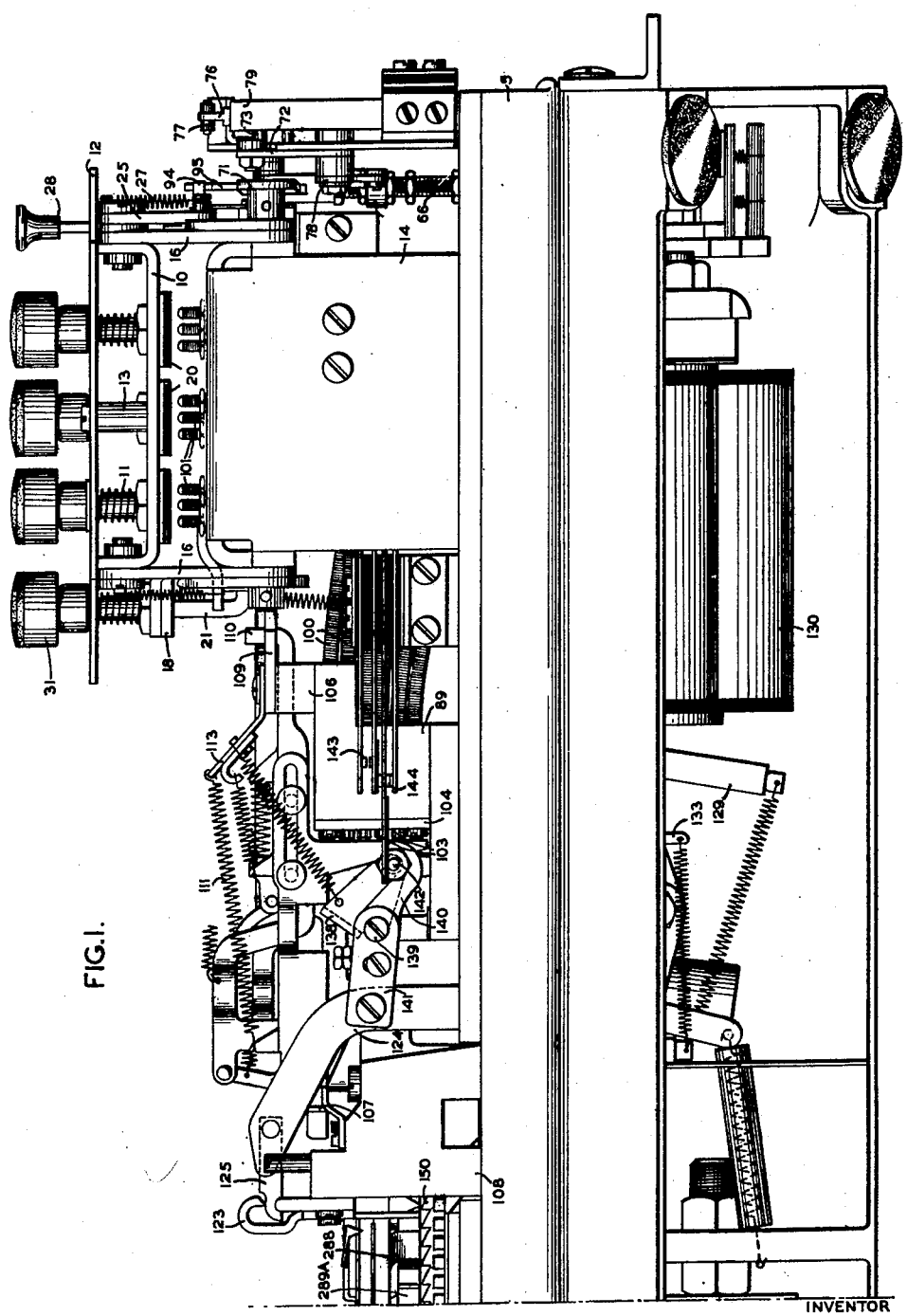
Figure 2:
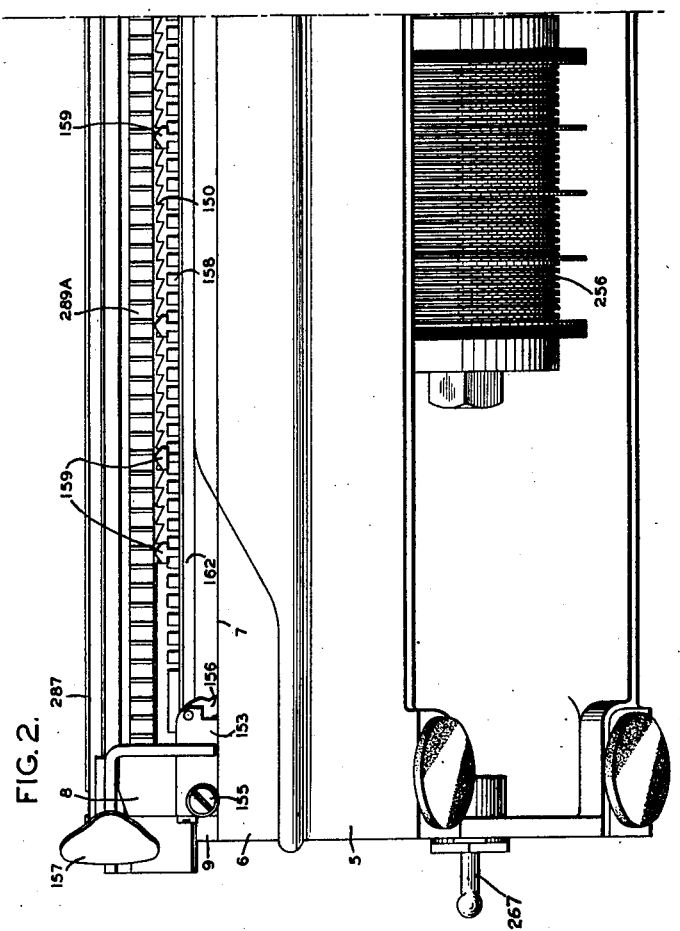

The mechanism of the invention in its present embodiment is mounted on a base casting 5 formed as shown in Figs. 1, 2, 5, and 6. The left-hand end of the base casting has a finger hole 6 to permit easy access to a card when in position on the surface 7. This surface forms a table on which the card is placed and along which it is carried to be picked up by an arm 8 secured to an escapement bar to form a carriage by which the card is carried to the right under the punch mechanism. A slot 9 is provided in the base as a guide for the arm 8 of the carriage which will be described in detail hereinafter.

Keyboard

The keyboard and associated punch mechanism is mounted on brackets secured to the right-hand end of the base.

The digit keys and release key (Figs. 1, 5, and 6) are mounted in a U-shaped plate 10 and are held in raised position by compression springs. The key stems 11 extend through a cover plate 12 which is secured to the plate 10 by screws 13 to form a unitary structure. Secured to the base casting 5 is a plate or bracket 14 formed as shown in Figs. 1, 5, 6, and 21. The keyboard is mounted for reciprocation with respect to the plate 14 by arms 15 pivotally secured to the two rear corners of the bracket and plate 10. In the front, arms 16 are connected to the plate 10 by a pin and slot connection and extend downward and are secured to a shaft 17 journalled in the plate 14, the shaft 17, when oscillated, being adapted to rock the arms 16 to shift the keyboard forward and backward. The space and keyboard shift keys are mounted in a bracket 18, secured to the plate 14 and extend through a slot 19 provided in the cover-plate 12.

Figure 5:
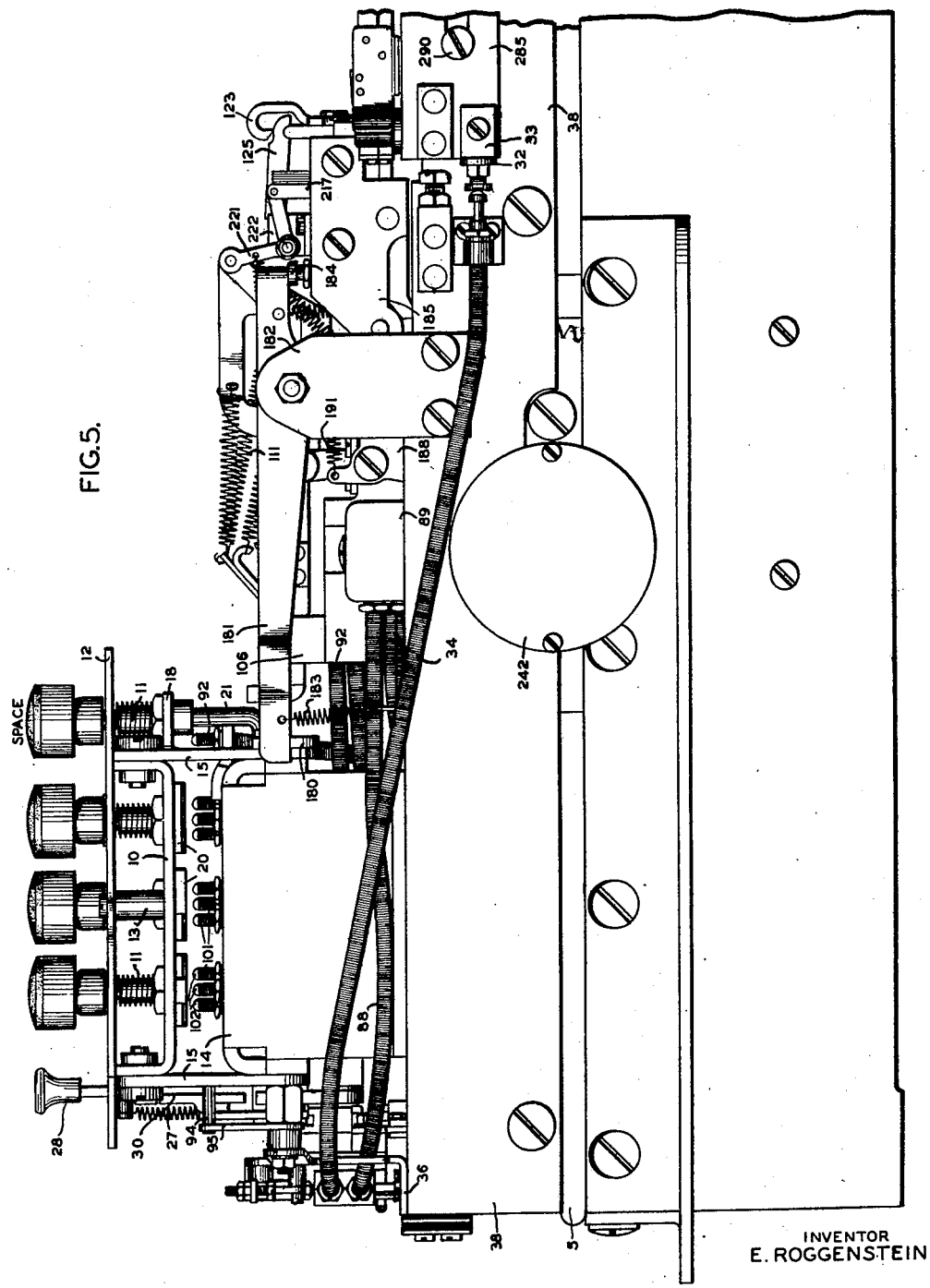
Fig. 5 is a rear elevation of the keyboard and associated mechanism.
Figure 6:
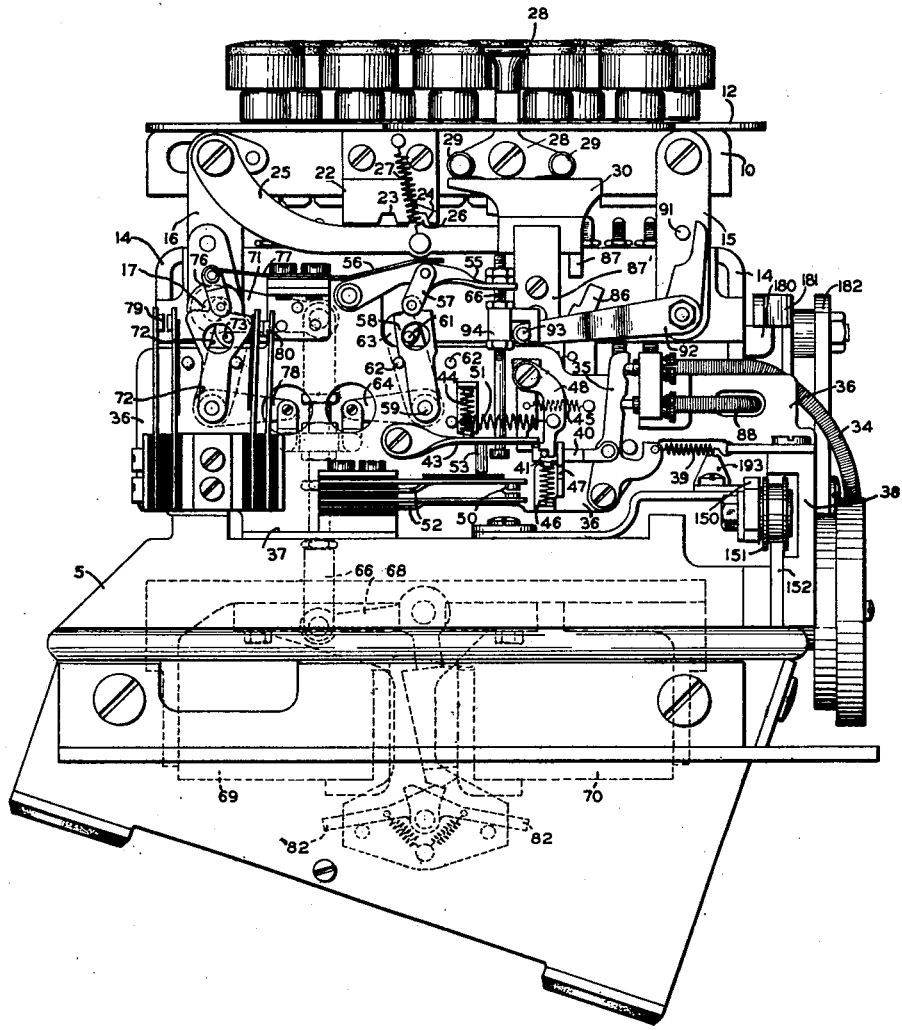
Fig. 6 is a view of the right-hand end of the machine disclosing the keyboard shift mechanism.

A block 20 is secured to the bottom of all key stems 11 except the space key, the stem 21 of which is extended to cooperate with the spacing mechanism to be described in detail later. The blocks 20 are formed as shown in Figs. 5 and 21.

Keyboard shift mechanism

Figure 8:
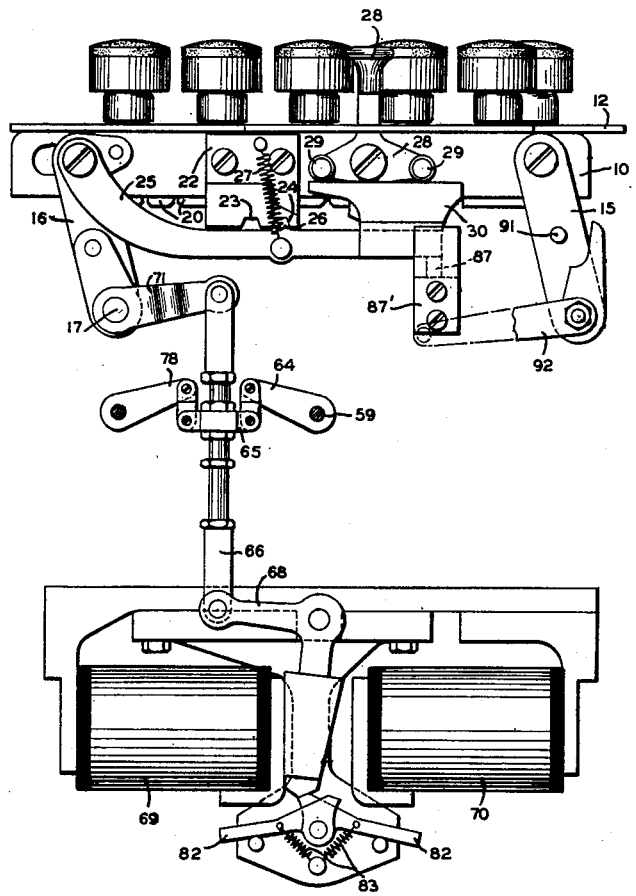
Fig. 8 is a fragmentary detail view of the keyboard, the shifting magnets, and associated linkage.

Secured to the right-hand side of plate 10 (Fig. 6) is a plate 22 having notches 23 and 24 formed therein. Pivotally mounted on the connecting pin for arm 16 is a lever 25 having a lug 26 formed thereon which is adapted to cooperate with the above notches to limit the movement of arms 16 in their pin and slot connections with respect to the keyboard. The lug 26 is held in engagement with the notches by a spring 27. Pivotally secured to the plate 10 is a lever 28 formed as shown in Fig. 8 and having rollers 29 mounted thereon for engagement with a track plate 30 secured to the extreme free end of lever 25.

The lever 28 extends through a slot in the cover-plate 12 to provide a handle for manually shifting the keyboard to either the forty-five-column code or upper ninety-column code positions. When the lever 28 is rocked either toward the front or back of the machine the rollers 29 force the lever 25 downward, thereby removing the lug 26 from the notch in which it was positioned and further pressure on the lever 28 shifts the keyboard in the direction of the pressure until the end of the slot in the plate 10 limits on the pivots of arms 16. It will be seen from this that the keyboard is manually shifted from the position for 45-column code perforating to upper 90-column code work, or the reverse, by means of the lever 28.

When the keyboard is shifted to the lower ninety-column position by operation of the shift key the lug 87 (Fig. 8) is drawn into contact with block 87' thereby prevents the rocking of lever 28 and thus preventing the shifting of the keyboard from lower ninety to upper ninety by manual means.

Figure 9:
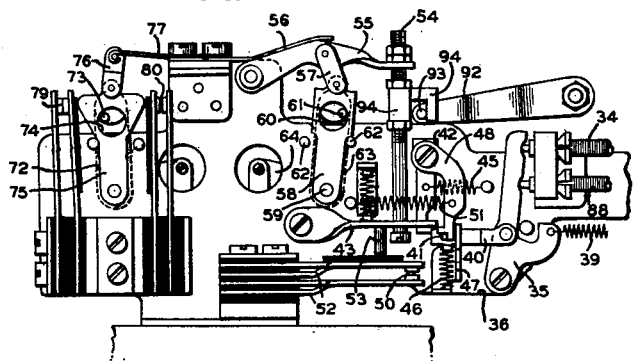
Fig. 9 is a fragmentary detail view of the electrical control mechanism associated with the keyboard shift.

The shifting of the keyboard from upper ninety to lower ninety is accomplished by means of a pair of electromagnets 69 and 70 under control of either a shift key 31 (Fig. 3) or a lug 32 (Figs. 3, 5, and 6) on a bar 33 which is actively associated with a portion of the card carriage. A Bowden wire 34 connects the lug 32 with a lever 35 which is pivoted on a vertical plate 36 secured to the base casting 5 by flange 37 and to a vertical rear plate 38 which extends the length of the rear of the machine. The lever 35 (Fig. 9) is held in contact with the end of the Bowden wire 34 by a spring 39.

Pivoted to the lever 35 is a forwardly extending finger 40 which is guided by a flange 47 fixed upon the plate 36. The forward end of the finger 40 is urged upward by a compression spring 46 and cooperates with the lower position of a downwardly extending latch 42. The latch 42 is pivoted upon the plate 36 and is tensioned in a counter-clockwise direction by a spring 45. The latch 42 has formed on its lower end thereof a hook portion which passes through a slot formed in a rearwardly extending arm 43 pivoted upon the plate 36. The hook portion of the latch 42 is adapted to engage the arm 43 against the action of a compression spring 44. The spring 44 presses at its upper end against an angle plate 44a secured to the plate 36 and at its lower end against the arm 43. The arm 43 has secured thereon a downwardly extending pin 53 which is adapted to close a pair of contacts 50 and 52. It is thus seen that a counter-clockwise rocking of the lever 35 will rock the latch 42 clockwise, thereby unlatching the arm 43 to permit the closing of the contacts 50 and 52 as shown in Fig. 10. Extending through an opening in the arm 43 is a shouldered pin 54 which, upon the closing of the contacts 50 and 52, moves upward, under the control of means later to be described, to restore the arm 43 to normal and permit the opening of the contacts which it controls. However, inasmuch as the restoration of arm 43 by pin 54 takes place immediately upon the closing of the contacts 50 and 52, the lever 35 has not had time to return to normal position and, therefore, still holds the latch 42 disabled. In order that the arm 43 may be held in normal position until such time as the lever 35 may be released by the Bowden wire 34 an auxiliary latch 48 is provided which is also pivoted to the plate 36. In the normal position of the parts (Fig. 10) a lug 49 on the latch 48 is positioned just to the rear of the arm 43 and as the finger 40 travels forwardly to disable the latch 42, a pin 41 on finger 40 moves away from its normal retaining position against the latch 48, whereupon lug 49 limits against the rear edge of arm 43. Now, as the arm 43 drops downward in the previously described manner, the parts assume the position shown in Fig. 10 with the lug 49 still limiting against the rear edge of the arm. Immediately thereafter the pin 54 elevates the arm 43 to a position higher than normal, thereby permitting the latch 48 to rock a short distance in a clockwise direction under tension of an associated spring 51 to place the lug 49 beneath the arm and hold it elevated (see Fig. 11). Upon the withdrawal of Bowden wire 34 the lever 35 and finger 40 are moved rearwardly by spring 39 whereupon latch 42 returns to effective position and the pin 41 in finger 40 disables the auxiliary latch 48. The arm 43 then drops downward slightly until it is engaged by latch 42, thereby placing the parts in their original normal position.

The restoring pin 54 (Fig. 9) is guided at its lower end in the arm 43 and at its upper end in an arm 55 which is pivotally mounted on the frame 36 and spring pressed downward by a leaf spring 56. Secured to the mid-portion of arm 55 is a toggle comprising links 57 and 58, the link 58 being pivotally mounted on stud 59 in the frame 36 and having an opening 60 therein adapted to cooperate with a pin 61. Stop pins 62 limit the travel of the toggle. The pin 61 is part of an eccentric screw which is so formed as to permit adjustment with regard to the opening 60, and is carried in an arm 63 positioned behind frame 36 and pivoted on the other end of stud 59. The arm 63 is secured to an arm 64 and these arms in effect constitute a bell-crank which is secured to a collar 65 (Fig. 8) fast on a rod 66, the lower end of which is connected to a bell-crank 68, one arm of which constitutes an armature for opposing magnets 69 and 70. The top of the rod 66 is secured to an arm 71 which is, in turn, secured to the shaft 17, to which the shift arm 16 for the carriage is also secured. The arm 71 and arm 16 being secured to the shaft 17 form in effect a bell-crank which, when rocked, shifts the key carriage from one position to the other. The arm 16 is secured from movement in the slot in plate 10 by the cooperation of lug 26 on the arm 25 with the notch 24 in plate 22. Secured to the other side of the collar 65 is an arm 78 which forms a bell-crank with arm 72 similar to arms 63 and 64. The arm 72 carries a pin 73 which is adapted to cooperate with an opening 74 in a toggle arm 75. The other half of the toggle comprises a link 76 connecting the arm 75 and a leaf spring 77. The arm 75 is formed with ears thereon which alternately cooperate with contacts 79 and 80. The armature 68 for the magnets 69 and 70 has a pair of arms 82 formed as shown in Fig. 8 which are adapted to hold the armature in its operated position after the operating circuit for the magnet is broken. In operation, if the armature is in the position shown in Fig. 8 and the magnet 70 is operated, the armature in traveling from the position shown forces the arms 82 down against the action of the springs 83 which immediately snap back holding the armature in its operated position.

Figure 7:
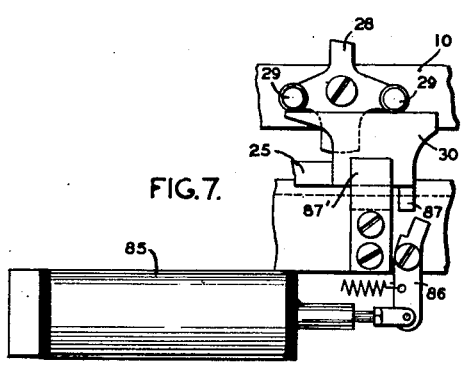
Fig. 7 is a fragmentary view of the keyboard locking mechanism and associated operating magnet.

In operation, the rocking of lever 35 by the Bowden wire 34 causes the arm 43 to close the two contacts 50 and 52. The operation of contact 50 closes one side of the supply line, thereby completing the supply circuit for the machine. Contacts 52 close a circuit for operating a solenoid 85 (Fig. 7), which rocks an arm 86 under a lug 87 on the plate 30 of the carriage shift mechanism, thereby preventing the depression of the lever 25 by lever 28, thus preventing the manual shifting of the keyboard while any of the keys are being operated.

Immediately upon the completion of the supply circuit a second circuit is completed through the contact 79 (Fig. 9) to operate the magnet 70 (see also Fig. 8), thereby shifting the armature to thereby draw the rod 66 downward. The downward movement of the rod 66 rocks the toggle arm 63 to the left and toggle arm 72 to the right. The lengthening of toggle 57—58 raises arm 55, thereby raising the pin 54 and restoring arm 43 to the control of latch 42, as described above. The lengthening of toggle 75—76 causes the arm 72 to snap to the right, thereby opening the circuit for magnet 70 through contacts 79 and preparing a circuit for the magnet 69 through contacts 80. The shift key 31 (Figs 3 and 6) as mentioned above also operates lever 35 through the medium of a Bowden wire 88, and thereby shifts the keyboard in the manner described above.

The shift key 31 actuates a short Bowden wire 90 (Fig. 20) which is anchored in a block 89. An aperture in the above block contains a pivotally mounted lever 95 having equal arms, one arm of which is acted upon by Bowden wire 90 and the other of which acts upon the Bowden wire 88 extending to the lever 35. Any depression of the shift key is transmitted to the lever 35 by the above lever which is provided to obviate the necessity of the sharp turns which would occur if one Bowden wire had been used.

To prevent the shifting of the key carriage, by the shift key 31, while in the 45-column position, a pin 91 (Figs. 6 and 8) is provided in the right-hand arm 15 which is adapted to cooperate with a bell-crank 92 pivoted on the pivot pin of arm 15. The bell-crank 92 has a pin 93 therein which cooperates with a U-shaped member 94 secured on the rod 54. When the keyboard is shifted to the most rearward position, i. e., 45-column, the pin 91 rocks bellcrank 92, which through pin 93, thereby elevates the rod 54 which, in turn, raises the arm 43 out of contact with the latch 42 and holds it from downward movement during the time the keyboard remains in the forty-five-column position. It is apparent from the above that, while in the 45-column position, the keyboard may only be shifted manually, while in the lower 90-column position, it may only be shifted by the depression of the shift key 31, or through the Bowden wire 34 in the manner previously described.

Punch mechanism

Figure 3:
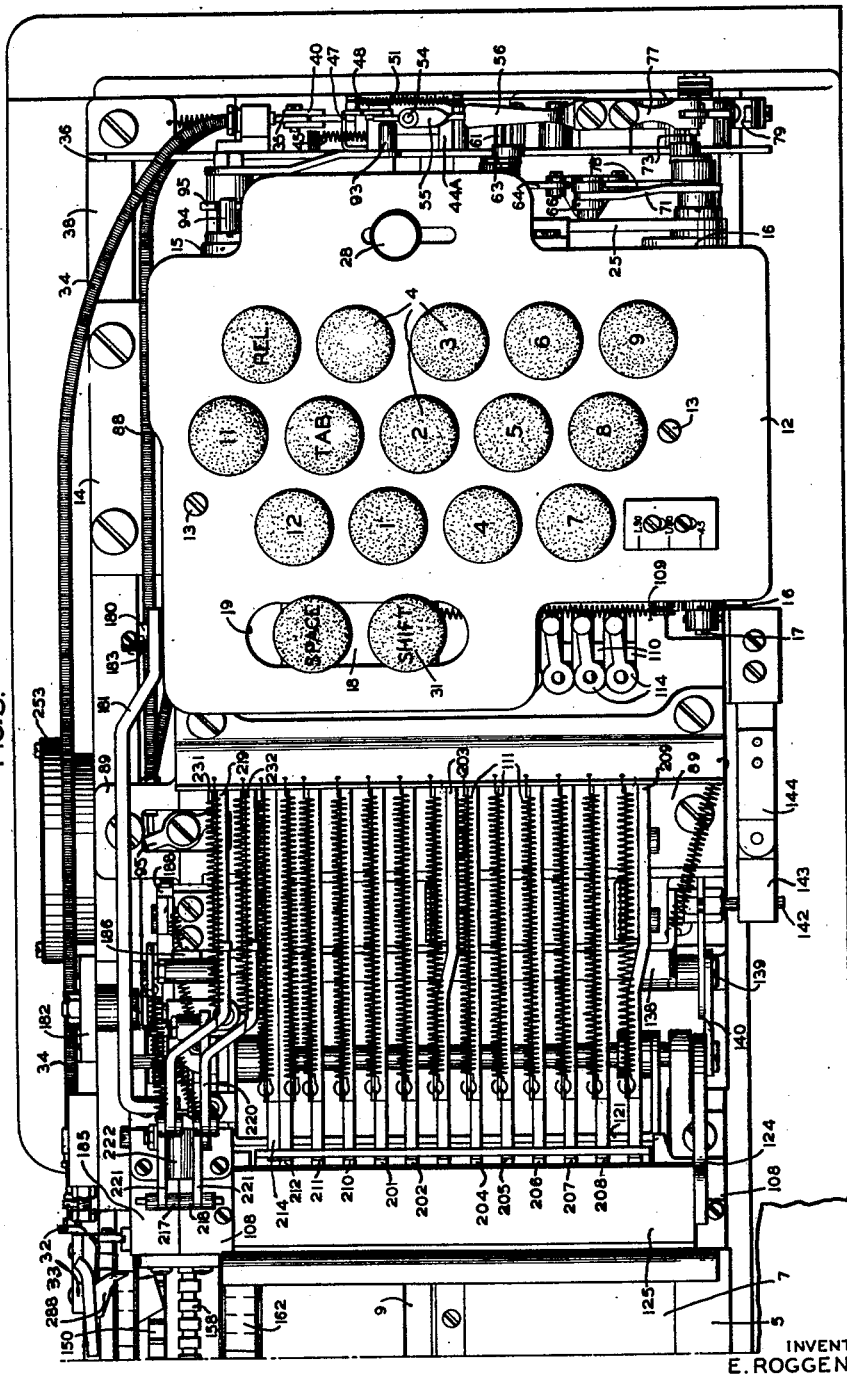
Figure 12:
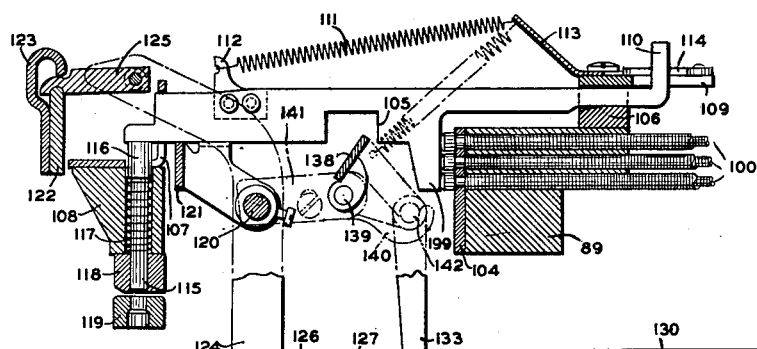
Fig. 12 is a fragmentary detail view of a digit interponent slide, the hammer bail mechanism, associated punch and bail operating magnet.
Figure 13:
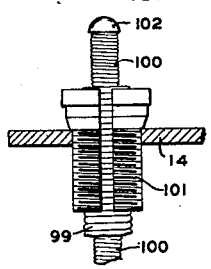
Fig. 13 is an enlarged detail view of the connecting means for the ends of the Bowden wires associated with the keys.
Figure 14:
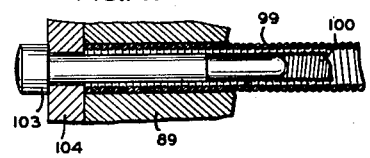
Fig. 14 is an enlarged detail view of the connecting means for the ends of the Bowden wires associated with the interponent slides.

The previously mentioned block 89 formed as shown in Figs. 1, 3, and 15, is secured at the front end to the base casting 5 and at the rear to back plates 38 and provides an anchorage for one end of the Bowden wires 100 which connect the keys and their associated punch interponents. The other ends are anchored in plate 14 under the blocks 20 of the digit keys. A suitable anchorage for the wires 100 in plate 14 is shown in Fig. 13 and comprises a split threaded sleeve 101 which is adapted to grip the cover 99 of the Bowden wire. When the sleeve is screwed into the plate 14 it grips the Bowden wire cover and secures it in place. The end of the Bowden wire is provided with a rounded cap 102. The anchorage in block 89 (Figs. 12 and 14) comprises a hole of approximately the diameter of the Bowden wire casing 99 into which the casing fits snugly Secured to the face of block 89 is a plate 104 having holes therein in alignment with the Bowden wires. The holes in plate 104 form bearings for plungers 103 formed as shown and secured to each individual Bowden wire. The plungers 103 are adapted to cooperate with and position punch interponent slides (Fig. 12) which are guided in slots cut in a block 106 secured to the top of block 89. The other ends of the slides are guided in a comb plate 107 secured to a block 108 secured to the base casting. A comb plate 109 secured to block 106 is provided to accommodate right angle lugs 110 which extend upward through the comb. The slides are held to the right (Fig. 12) against the Bowden wire 100 by springs 111 extending between hooks 112 on the slides and an angular plate 113 secured to the comb 109. Pivotally secured to the comb 109 and located between each of the lugs 110 is an arm 114, formed as shown in Fig. 3, which in effect constitutes a ball lock to permit the operation of only one slide at a time except in certain special cases which will be described in detail hereinafter.

Carried in the block 108 (Fig. 12) are twelve punches 115 each having a head 116 with which a compression spring 117 cooperates to hold the punches elevated. Secured to the bottom of the block 108 is a guide member 118. Aligned with and positioned below the guides is a punch die 119 secured in the base casting 5. The guide and die are spaced apart an amount equal to the thickness of a record card. In normal position the interponent slides rest on an escapement bail 121 secured to a shaft 120, and are held in normal position by the punch 115 and spring 117.

Fulcrumed on a bar 122 which extends across the machine and is secured to block 108 is a hammer bail bar 125 which is held in position on the bar 122 by a spring steel clamp 123. Pivotally secured to the hammer bail is a link 124 (see also Fig. 1), which is, in turn, secured to a bell-crank 126 pivoted on stud 127 carried in a bracket (not shown) secured to the underside of the base casting 5. The other arm of bell-crank 126 is connected to the armature 129, of a power magnet 130, by a link 131. Secured to the link 131 is a right angle lug 132 which is adapted to act on a link 133 having a shoulder 134 formed thereon which cooperates with a leaf spring 135. The leaf spring has a button 136 of insulation which is adapted to close the contacts 137 when the spring is raised. The link 133 is connected to a bail bar 138 pivoted on a cross rod 139.

When any one of the punch slides is moved to the left (Fig. 12) by a Bowden wire 100 a shoulder 105 thereon contacts and rocks bail 138 which, in turn, raises the link 133 to close the contacts 137 to complete a circuit for energizing the power magnets 130 which, in turn, attract their armature 129 rocking the hammer bail 125 through the link 124, bell-crank 126 and link 131. The slide in moving to the left comes under the hammer which when rocked clockwise depresses the interponent slide which, in turn, depresses the punch 115 to perforate the card. The movement of link 131 to the right brings the lug 132 into contact with link 133, thereby moving the shoulder thereon out of the path of spring 135 and permitting contacts 137 to open releasing the magnets 130. The depressing of the interponent slide rocks the bail 121 in a counter-clockwise direction rotating the shaft 120 and operating the escapement mechanism which will be described hereinafter. Pivotally mounted on shaft 139 (Fig. 1) is a hook-shaped lever 140, one end of which is connected by an adjustable pin and slot connection to a link 141 connected, in turn, to the link 124 and pivoted on rod 139, the other end being adapted to engage the pin 142 connecting the bail 138 and link 133. This lever is provided to insure that the contacts 137 will remain closed until the bail 121 has completed its operation. The pin 142 is adapted to open contacts 143 and close contacts 144 by means of which the power circuit is controlled, as will be described later.

The interponent slides are arranged in the machine as shown in Figs. 3 and 15 and have been designated as 212, 211, 201, 203, 204, 205, 206, 207, 208, and 209, the last digit of the reference character representing the respective position in the card over which the slide is located. The slides 211, 210, 201, 202, 204, 205, 206, 207, and 208 are formed as shown in Fig. 12, having a shoulder 199 thereon against which the selected Bowden wire acts to move the slide. There are three Bowden wires leading to each of these slides, one for each position of the keyboard.

The slides 203 and 209 are formed of two members as shown in Figs. 16 and 17, the member 209 being secured to the member 198 by a pin and slot connection. Formed on the member 209 is shoulder 105 similar to that on the other digit slides. On the member 198 is a shoulder 197 of such a depth as to be engaged only by the upper of the three Bowden wires 100 which is effective when the keyboard is in the forty-five column position. These slides are formed in this manner to permit the use of a slide 203 or 209 together with one of the other digit slides, while punching in the 90-column code. As described in the above Lasker patent, odd numbers are indicated by single hole punchings and even numbers indicated by combining the next higher odd number perforation with a "nine" perforation. In the upper ninety-column code, the slide 203 controls the "nine" perforation, while slide 209 controls the "nine" perforation in the lower 90-column code.

Therefore, when the slide 209 is operated from the "nine" key with the keyboard in the 45-column position, the Bowden wire 100 acts on shoulder 197, thereby moving both members 198 and 209 to the left (Fig. 17). This movement carries the lug 110 into the ball lock, thereby preventing the simultaneous operation of another key. In the upper 90-column position of the keyboard, the operation of the "nine" key causes the operation of the slide 203 and the depressing of a "two" key operates slide 211 and the forward member of slide 203. Due to the fact that the forward member moves independently of the member 198, the lug 110 is not carried into the ball lock and, therefore, the lug 110 on the slide 211 may enter the ball lock and thus prevent the simultaneous depression of another digit key. With the keyboard in the lower 90-column position, a similar operation occurs using the slides 209 and 205 for causing the perforations for the digit "two".

In the embodiment shown it is not desired to perforate the "zero" designation in the 90-column zones of the card. Therefore, space or zero slide 214 when actuated by the blank key merely causes the carriage to space through the medium of bail 138 as described above. It will be noted that the nose of the slide 214 has been removed, thereby preventing the depression of the slide by hammer bail 125.

The "twelve" slide 212 is shown in Fig. 19 and is the same as the other digit slides with the exception that the lug 110 has been omitted and the shoulder 196 has been shortened to prevent operation of the "twelve" slide when the keyboard is in lower ninety column position. In this position the depression of the "twelve" key causes the operation of the slide 204. The operation and construction of the tabulator slides will be taken up later during the description of the carriage control mechanism.

*Bowden wire connections*

As mentioned above, the Bowden wires 100 are secured at one end in a block 89 and at the other end in a plate 14 located below the keyboard. Each of the key shanks has secured thereto a block 20 which may be of five different formations as shown in Figs. 21, 22, and 23. One form is that associated with all the digit keys except the "eleven". This form is of sufficient length to extend over the ends of two Bowden wires secured in side by side relation in plate 14. The block 20A associated with the "eleven" key is formed as shown to permit it to actuate its associated Bowden wire only when the keyboard is in the 45-column position (Fig. 21). The release key has a block 20B, positioned as shown, which is adapted to actuate a single Bowden wire in all positions of the keyboard. The tabulator key Tab has a block 20C secured thereto which is formed as shown to operate a Bowden wire to the space slide 214 in all positions and one or the other of two wires to the skip mechanism which will be described hereinafter. The blank key which is used for "zero" spacing has a block 20D secured thereto which is adapted to actuate a Bowden wire to the slide 210 while the keyboard is in the 45-column position (Fig. 21) and only the wire to the space slide 214 when in the other two positions (Figs. 22 and 23).

Figure 24:
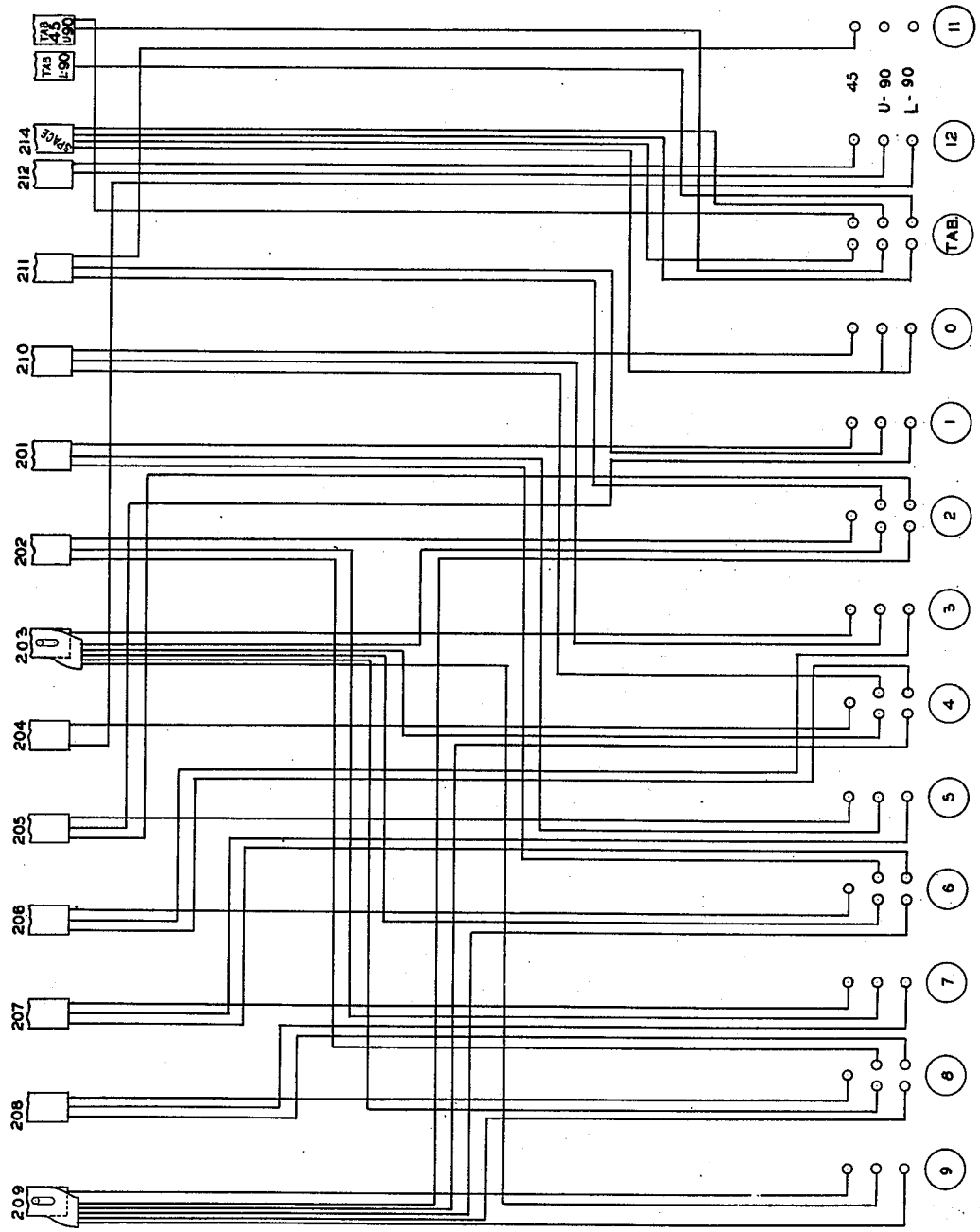
Fig. 24 is a schematic diagram showing the Bowden wire connections between the interponent slides and keys.

All of the Bowden wire connections are shown in the diagram of Fig. 24 in which the keys are shown at the bottom of the sheet and the slides at the top. The small circles associated with each of the keys simulate the tips 102 of the different Bowden wires and are arranged in three positions, the upper being the 45-column position, the middle the upper 90-column position, and the lower arrangement that of the lower 90-column position. From this diagram, together with Figs. 21, 22, and 23, all of the combinations of interponent slides may be readily determined for each key in the keyboard except the release key Rel and space key Space, the operations of which will be described hereinafter.

The Roman numerals associated with the Bowden wires in Figs. 21, 22, and 23, correspond to the columnar positions of punchings in a card as disclosed and described in the Patent 2,044,708 referred to above.

Card carriage

The card carriage moves the card over the finished surface 7 (Figs. 2 and 4) of casting 5 by means of an arm 8 secured on an escapement bar 150. The bar 150 is provided with rollers 151 (Fig. 6) at each end which ride on a track 152 secured to the base casting 5. The front end of arm 8 is provided with an arm 153 which is positioned in the slot 9 and has a slot cut therein (not shown) which engages the edge of a plate 154 secured to the base 5 and extends over the edge of the slot 9. The engagement of the slot with plate 154 prevents the carriage arm 8 from being raised out of the slot 9. The arm 153 is provided with a roller 155 (Fig. 2) which rides on the plate 154 and is so positioned as to insure free movement of the carriage. The front of arm 153 is bifurcated and a spring pressed arm 156 pivoted therein acts as a card gripper. The face of arm 156 is formed with a cam surface which causes the arm to rotate in a clockwise direction (Fig. 2) out of the path of the card when it is placed on the table and to hold it there by an easy pressure until time for removal, at which time the arm is again cammed out of the path of card to permit its removal. A finger plate 157 is provided on the arm 8 to permit manual adjustment of the carriage.

Secured to the escapement bar 150 is a tabulator bar 158 having slots cut therein on which tabulator stops 159 and 160 may be positioned. The stops are formed as shown in Figs. 27, 28, and 29, the stop 159 being used for upper or lower ninety column work and stop 160 being used for forty-five column work or where it is desired to tabulate in the same fields in both the upper and lower ninety-column zones of a card. As tabulator stops are well known in the art, it is only necessary to point out that the lug or head portion 161 of the stop 159 is positioned to extend to the rear of bar 158 (see left-hand stop 159, Fig. 4) for upper ninety-column work and to the front of the bar (right-hand stop 159, Fig. 4) for lower ninety-column work. A scale 162 secured to the base 5 is calibrated in columns to assist the operator in positioning the tabulator stops. The stops when in position are adapted to cooperate with the skip stop mechanism as will be described later.

Escapement mechanism

Figure 4:
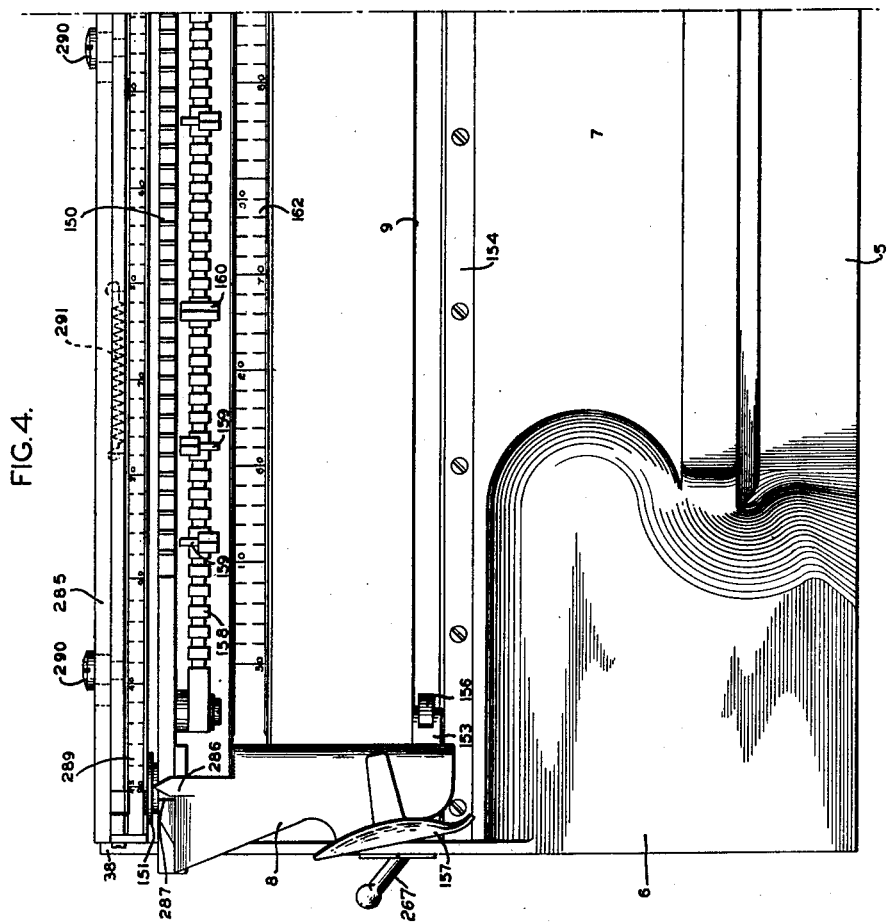

The escapement bar 150 (Fig. 25) referred to above has ratchet teeth cut in the top edge and spur teeth in the bottom thereof. The spur teeth are continually in mesh with a gear 163 mounted on a stud shaft 164 secured in the base 5. A spiral spring (not shown) similar to a clock mainspring is suitably secured to the gear 163 and tends to rotate the gear in a clockwise direction (Fig. 25), thereby moving the escapement bar 150 and the attached carriage toward the right. Pivoted on the shaft 120 (Figs. 25 and 26), and adapted to cooperate with the ratchet teeth on bar 150, is an escapement pawl 165. The pawl is formed as shown, with an arm 166 and a lug 167 thereon. Also pivotally mounted on the shaft 120 is a pawl actuating arm 168 having an ear 169 in which is secured a pin 170 adapted to cooperate with a hole 171 in the pawl 165. An ear 172 formed on the upper edge of the bail 121 carries an adjustable screw 173 which engages the upper edge of arm 168. An adjustable screw 174 fastened in the upper surface of arm 168 is adapted to contact a rearwardly bent arm of a lever 175 also pivotally mounted on the shaft 120. The lever 175 has a pin 176 secured therein which is adapted to engage a fork formed in the upper portion of a holding pawl 177 freely pivoted on a stud shaft 178. The above mechanism comprises the escapement pawl and holding pawl operating mechanism. When the escapement bail 121 is rocked clockwise (Fig. 25) by the interponent slides as described above the arm 168 is rotated clockwise by screw 173 and the pin 170 engages the top of hole 171 and raises the escapement pawl 165 from engagement with the rack 150. At the same time, the arm 175 rocks clockwise as it is no longer held by screw 174 permitting pawl 177 to rotate clockwise to engage the next adjacent tooth, thereby permitting the carriage to move the distance of one tooth. The ratchet teeth are spaced at intervals equal to the distance between columns on a record card. Therefore, for each operation of the escapement pawl the carriage is moved one step to the left (Fig. 4).

The escapement mechanism may be controlled and operated by the Space key, the bail 121 as described above, the tabulator key Tab or the release key Rel.

Figure 30:
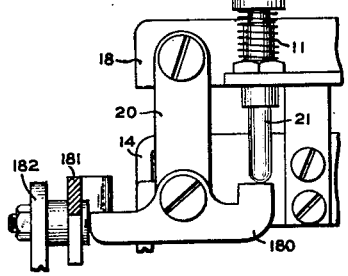
Fig. 30 is an enlarged detail view of the mechanism associated with the space key.

The mechanism for operating the escapement by the Space key comprises a lever 180 (Figs. 3, 5, and 30) pivoted on the plate 14 and adapted to cooperate at one end with the stem 21 of the space key and at the other end with a lever 181 pivoted on a stud carried by a plate 182 secured to the base 5. The lever 181 is biased in a counter-clockwise direction by a spring 183 and has a right-angle lug formed on its short end which cooperates with a pin 184 slidably mounted in a casting 185 secured to the block 108. The pin 184 is adapted to operate the holding pawl 177.

When the Space key is depressed the lever 180 is rocked clockwise (Fig. 30) rocking lever 181 clockwise (Fig. 5) depressing pin 184 and rocking holding pawl 177 (Fig. 25) into the path of the teeth on the escapement bar 150. At the same time the notch in the holding pawl engages the pin 176 rocking the lever 175 clockwise rocking arm 168 through screw 174 in a clockwise direction. This movement raises the pawl 165 as described above and permits the rack to take one step forward, thereby spacing the carriage.

The mechanism for operating the escapement under control of the release key Rel. comprises a Bowden wire 187 (Figs. 25 and 26) which is adapted to actuate a cam lever 188 pivotally mounted on block 89. The lever 188 has a hook formed on the bottom thereof and carries a spring-pressed ball detent 189 adapted to cooperate with two detent sockets 190 cut in the block 89. A spring 191 secured between the lever 188 and a frame 186 tends to rotate the lever in a clockwise direction but is not of sufficient strength to overcome the locking action of the ball detent. The hook portion of the lever 188 is adapted to engage a pin 192 in the escapement pawl 165.

When the release key is depressed the Bowden wire 187 rotates the lever 188 counter-clockwise (Fig. 25) to engage the pin 192, thereby raising the pawl 165 out of engagement with the rack 150. Due to the lost motion between pin 170 and the hole 171 the lever 175 is not actuated and, therefore, the holding pawl is not lowered, thereby freeing the carriage to move to the extreme left of the machine under the pull of the coil spring associated with the gear 163. The lever 188 is held in its operated position by the ball detent after the release key is released and the Bowden wire retracted by its spring. A stop member 193 (Figs. 6 and 25) secured to the rack 150 engages a pin 194 in the lug 167 on the pawl 165, rocking the pawl down into engagement with the rack. At the same time the pin 192 engages the hook lever 188 snapping the detent ball out of the upper socket 190 and into the lower socket, thereby positioning the lever in its normal position, as shown in Fig. 25.

There are two skip stop arms 217 and 218 (Figs. 3 and 25) provided, one for cooperating with stops 159 or 160 set for forty-five and lower ninety-column work, and the other with stop 159 set for upper ninety-column work as described above. The mechanism for operating the skip stop arms 217 and 218 is controlled by the tabulating key Tab, and comprises slides 219 and 220 similar to the interponent slides 201–214, inclusive, with the exception that the front end of each is pivotally connected to a bell-crank 221 pivoted to a bracket 222 (Figs. 3 and 5) mounted on the blocks 108 and 185. The slide 219 has a pin 224 thereon adapted to cooperate with a hook-shaped lever 225 pivoted on shaft 120. The lever 225 is held in contact with a pin 226 on the arm 166 of pawl 165 by a spring 227. The pin 226 extends on both sides of the arm 166 and cooperates with a lever 228 pivotally mounted on shaft 120. This lever is held against the pin 226 by a spring 229 which also maintains the lever in contact with a pin 230 in the slide 220. The slides 219 and 220 are spring-biased toward the left (Fig. 3) by springs 231 and 232. Pivotally mounted upon each of the slides 219 and 220 is a lever 233 having a lug 234 formed on the lower end thereof, each of which is adapted to cooperate with a Bowden wire. The lever 233 also is formed with an upstanding portion 235. Secured to each of the slides 219 and 220 is a shoulder 236, which is used for the anchorage of a compression spring 237 extending between the portions 235 on lever 233 and shoulders 236 thereby forming a spring connection therebetween. A limit pin 238 in the portions 235 limits the clockwise rotation of the levers 233.

When the tabulator key Tab is operated with the keyboard in the forty-five or lower ninety-column position, the Bowden wire 240 is operated, at which time the slide 219 is moved to the right, (as viewed in Fig. 25), thereby rocking the bell-crank 221 to depress the skip stop 217 into the path of the tab stops. Simultaneously therewith with pin 224 having been moved to the right (Fig. 25), the lever 225 is permitted to rotate clockwise engaging the pin 226, thereby tends to rock the escapement pawl 165 out of the path of the teeth on rack 150. Pawl 165, however, is not raised by this medium due to the heavy pressure exerted on escapement 150 by the main spring 163 which holds the pawl 165 against the action of spring 227. It will be noted in Figs. 21, 22 and 23 that the plate 20C associated with the "Tab" key lies over a Bowden wire leading to the space bar 214, which, as described above, raises pawl 165 through the medium of pin 170, which is raised by the hammer bail 125 depressing the interposed slide and rotating the escapement bail 121, under control of the hammer bail magnet. The raising of pawl 165 lowers pawl 177 into contact with the escapement rack. The circuit for the hammer magnet is only momentarily energized and immediately after the hammer bail raises the escapement bail rotates shaft 120 in a counterclockwise direction lowering pin 170 and raising pawl 177. The pawl 165 however is held up by the spring 227 acting through lever 228 and pin 226 on the pawl. When the "Tab" key is released the bar 219 is moved to the left by spring 232 causing pin 224 to engage lever 228 and restoring the pawl 165 to operative position. As shown in Figs. 4 and 25, the tabulator stop 160 and the lower end of arm 217 are formed with similarly disposed cam faces so that upon engagement of the two members, the assembly comprising arm 217, lever 221 and slide 219 is forced to return to normal position against the pressure of spring 237, thereby permitting the pawl 165 to reengage its rack 150.

When the tabulator key Tab is actuated with the keyboard in the upper 90-column position, the operation is the same except that a Bowden wire 241, the slide 220, pin 230, lever 228, arm 218 (Fig. 3), and skip stop 159 are effective. The pawl 165 is raised and the carriage escapes to the left until the arm 218 engages the stop 159.

Rack 150 is biased to the right (Fig. 25) by a coil spring through the medium of gear 163 as described above. The full power of the spring acting on the rack would jar the mechanism unnecessarily. Therefore, a braking mechanism is attached to a stud shaft 243 to which is secured a gear 244 and an arm 245. Pins 246 and 247 are secured in the arm 245 and act as stops by engaging slots in arcuate brake shoes 248 and 249 which are pivoted on cover plate 242 (Fig. 5) in which is also secured pins 250 and 251. The brake shoes are adapted to engage the inner surface of a cup-shaped casing 253 secured to the base 5.

When pawls 165 and 177 disengage the rack 150, gear 163 rotates counter-clockwise (Fig. 25), arm 245 rotates counterclockwise and engages pins 250 and 251 which, through plate 242, rotates brake shoes 248 and 249. Since the brake shoes are pivotally mounted, the centrifugal force tends to throw the brake shoes outwardly, thereby creating friction between said shoes and the inner surface of the casing 253, thus retarding the motion of the rack and slowing up the motion of the carriage. When the motion of the rack 150 is arrested, the gears and the arm 245 stop, but the pins 250 and 251 engage the slots of the brake shoes, so that on the return of the carriage the shoes are held ineffective.

*Detailed operation*

Since the operation of the machine is almost entirely electrical, the circuit of the machine will be followed during the description of the detailed operation of the machine.

The circuit is shown in Fig. 31 and includes all of the magnets and contacts described above as well as the rectifier 255 and the thermo-electric coil or breaker contacts 256. The rectifier is of the plate type and is described and disclosed in my copending application S. N. 101,903 mentioned above. Briefly, it comprises a series of plates or discs of copper-oxide and lead assembled on a core cylinder and compressed by a central bolt and nut. Either alternating or direct current may be applied to the rectifier which, as is well known, will deliver D. C. at its output terminals. Due to the comparatively small number of discs used in the construction of the rectifier which affect the resistance and voltage drop only slightly, it is possible to rectify 110 volts A. C. to approximately 100 volts D. C. It is well known that rectifiers of this type when in continuous use generate considerable heat which causes the device to fail. However, since the operation of the present machine is intermittent, the rectifier may be operated at a safe temperature. The circuit of Fig. 31 comprises two individual circuits, one the rectifier or power circuit and the other the actual operating circuit.

The rectifier circuit extends from input terminal 258 through fuse 259, contacts 256, conductor 260, to the two outer terminal plates 261 of the rectifier. The other side of the input circuit extends from terminal 262 over conductor 263, through contacts 143 and conductor 264 to the terminal disc 265. It will be noted that the contacts 143 are shown open which is the normal position. This contact is only closed when the pin 142 (Fig. 12) is raised by the rocking of the escapement bail 138, and is held elevated by the hook 140 until the punching is finished. Thus, it is apparent the current only passes through the rectifier when the slides are positioned for controlling punching or spacing.

Another circuit is also completed from the input terminal 262 to the terminal disc 265 over conductors 263 and 266, left-hand leg of switch 267, conductor 268, contact 50 and conductors 269 and 264 to the terminal disc 265. This circuit is under control of the keyboard shift key which closes the contacts 50 and 52 and also under control of the switch 267. The switch 267 is adapted to control the automatic shift, comprising shoulder 287 on the card carriage, which actuates the lever 35 (Fig. 9) through the medium of stop 288, bar 285, lug 32 and Bowden wire 34 as described above. In other words, when the switch 267 is closed, the automatic shift is effective and will cause the keyboard to be shifted from one ninety-column zone to the other every time the card carriage is moved to its extreme right-hand position in the machine. When the switch is open, however, the circuit described above is ineffective. Therefore, no current will be supplied to the rectifier when the shift contacts 50 and 52 are closed by the pin 53 (Fig. 9) under control of the lever 35. Thus, with the keyboard positioned in either of the ninety-column positions and the switch 267 open, the shift key and automatic shift are disabled, thereby permitting the punching of data only in the zone in which the keyboard is positioned.

When a digit key is depressed with the circuit in the position shown, i. e., with contacts 80 and 144 closed, the Bowden wire connection moves the associated interponent slide to the left (Fig. 12), thereby positioning the nose thereof between the hammer bail 125 and the punch 115. On the forward movement of the slide, the shoulder 105 engages the bail 138, causing it to be rocked, thereby raising pin 142 which closes the contacts 143 and opens the contacts 144. The closure of contacts 143 completes the circuit from supply to the rectifier as described above. The opening of the contacts 144 opens the circuit to the shift magnets 69 and 70, thereby preventing the shifting of the keyboard while punching is being performed. Simultaneously with the above operations the bail 138 raises the link 133 which closes the contacts 137. The closing of contacts 137 completes a circuit from the positive terminal disc 270 on the D. C. side of the rectifier, through the conductor 271, the windings of power magnet 130, conductor 272, contacts 137, conductor 273 to the negative terminal disc 274, thereby operating the power magnet 130, which attracts its armature 129 which rocks the hammer bail 125 to depress the interponent slide, thus forcing the punch 115 through the card. Near the end of the travel of armature 129, the link 133 is disengaged from the contact 137, as described above, permitting the contacts to open, thus breaking the operating circuit for the magnet 130. It is apparent from the above that this circuit is maintained for a very short time, in fact, only long enough for the hammer bail to completely depress the punch.

Whenever current is supplied to the rectifier either by the closure of contacts 143 or contacts 50 and switch 267, the magnet 85 is operated, thereby interposing the locking member 86 (Fig. 7) under the lug 87, thereby preventing the manual shifting of the keyboard by the lever 28.

When the shift key 31 is depressed, the lever 35 is actuated as described above, thereby closing contacts 50 and 52. The closure of contacts 50 connects the input current to the rectifier as described above and the contacts 52 close a circuit from positive terminal disc 270, conductor 275, contacts 144, conductor 276, right-hand leg of switch 267, conductor 277, through the winding of magnet 69 if the keyboard is in the lower 90-column position, conductor 278, contacts 80, conductors 279 and 280, contacts 52, conductors 281 and 273 to the negative terminal disc 274. This circuit operates the magnet 69, causing it to attract armature 68, thereby shifting the keyboard as described above from the lower 90-column position to the upper ninety-position. It will be remembered that, when the keyboard is shifted the contacts 80 are opened and the contacts 79 closed, thereby establishing a circuit which when the shift key 31 is depressed extends from the positive terminal disc 270, conductor 275, contacts 144, conductor 276, right-hand leg of switch 267, conductor 277, magnet 70, conductor 282, contacts 79, which are now closed, conductor 280, contacts 52, conductors 281 and 273 to negative terminal disc 274. This causes the operation of magnet 70 which attracts the armature 68, thereby shifting the keyboard to the lower 90-column position. Contacts 50 and 52 are also opened as soon as the shifting is completed, by the action of pin 54 as described above.

In order to prevent overheating of the rectifier and the magnets 69 and 70, a thermo-electric coil 257 and contacts 256 are provided. The coil 257 is included in a circuit from positive terminal disc 270, conductors 275 and 283, through the coil 257, conductors 279 and 280, contacts 52, conductors 281 and 273 to the negative terminal disc 274. Consequently, when the shift key is operated, thereby closing contacts 52, if the keyboard fails to shift due to an outside source such as jamming or other mechanical fault, the current passing through the coil 257 will generate sufficient heat to cause the thermocouple to be distorted, thus opening the contacts 256 and breaking one side of the rectifier supply circuit. This will remove the current from the shift circuit to magnets 69 and 70, causing whichever one is energized to release. As soon as the coil 257 cools, the thermocouple returns to normal, permitting the contacts 256 to close and reestablish the rectifier supply circuit. If after a short interval the trouble has not been remedied, the coil 257 will again heat up and cause the opening of the supply circuit. This cycle of operation will continue until the keyboard shift is freed or repaired.

In operation a card is placed on the machined surface of the base 5 and the arm 156 is forced in until the card drops below the cam surface thereon. The arm 8 is then moved to the right (Figs. 3 and 4) until the entire card or any desired part is under the punches. The position of the card can be determined by the pointer 286 on the arm 8 and the scale 289 secured to a shiftable bar 285, mounted on the rear plate 38. If the card is of the 45-column type, the keyboard is shifted to the corresponding position by the lever 28. Should it be of the 90-column type, the keyboard is positioned in the desired 90-column position by use of either the lever 28 or the shift key 31. With the keyboard positioned in the desired position, the digit keys are operated to perforate the card. If it is desired to skip certain fields of the card, that is, certain groups of columns, the tabulator stops 159 or 160 are positioned on the bar 158 at the desired positions and when perforating is completed in a certain field the tabulator key Tab is depressed releasing the escapement mechanism and interposing one or the other of arms 217 or 218 in the path of the tabulator stops to halt the carriage at the desired column to continue perforating. If perforating is being done in the upper zone of a 90-column card, and there is further perforating necessary in the lower zone, the carriage is moved to the right, bringing a lug 287 (Fig. 4) into contact with a stop member 288 (Fig. 3) which may be selectively positioned on shifting bar 285. The bar 285 is provided with teeth 289A to hold the stop member in its adjusted position. The bar 285 is mounted on the rear plate 38 by a pair of screws 290 (Figs. 4 and 5) extending through slots in the bar. The bar is held to the left (Fig. 4) by a spring 291 which is anchored at one end in the bar and at the other in the frame.

When the shoulder 287 engages the stop member 288 the bar 285 is shifted to the right (Fig. 3) to engage the lug 32 with the Bowden wire 34, thus operating the shift mechanism to shift the keyboard to the lower ninety-column position.

When it is desired to release the card carriage for a full travel to the left to permit the removal of a card the "Rel" key is operated which disables the escapement mechanism as described in detail above.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What I claim as new, and desire to secure by Letters Patent, is:

1. In a card perforating device, a keyboard adapted to be set in one of a plurality of positions, punching means actuated by the keyboard, and lever means for alternately shifting said keyboard transversely to one or the other of two positions.

2. In a card perforating device, a keyboard adapted to be mechanically set in one of a plurality of positions, punching means actuated by the keyboard, and electrically actuated means for alternately shifting said keyboard to one or the other of two positions.

3. In a card perforating device, a keyboard adapted to be set in one of a plurality of positions, punching means actuated by the keyboard, and manually controlled means for electrically shifting said keyboard to one or the other of two positions.

4. In a card perforating device, a keyboard adapted to be set in one of a plurality of positions, punching means actuated by the keyboard, a reciprocating card carriage, and electrical means under control of said carriage for shifting said keyboard to one or the other of two positions.

5. In a card perforating device, a keyboard adapted to be set in a plurality of positions, a shifting means for said keyboard comprising a pair of electromagnets each under control of a contact in an operating circuit, and mechanical means associated with said keyboard for controlling said contacts to break the circuit to one magnet and immediately thereafter make the circuit to the other of said magnets thereby causing the keyboard to be shifted to one or the other of two positions.

6. In a machine of the class described, a keyboard, shifting means comprising an armature associated with said keyboard, an electric circuit containing a pair of alternately operable magnets associated with said armature, and means in said circuit for operating said magnets to effect a shift of said keyboard.

7. In a machine of the class described, a shiftable keyboard, a lever associated therewith, and an arm operable by said lever to effect shifting of said keyboard, an electric circuit, a solenoid in said circuit, and a second arm operable by said solenoid to engage said first arm, thereby preventing the shifting of said keyboard.

8. In a machine of the class described, a shiftable keyboard, a card carriage, a latch member controlling a contact in an electric circuit for shifting said keyboard, and means under the control of said card carriage for operating said latch member to permit shifting of said keyboard.

9. In a machine of the class described, a shiftable keyboard, a key, a latch member controlling a contact in an electric circuit for effecting the shift of said keyboard, and means under the control of said key for operating said latch member to permit the shifting of said keyboard.

10. In a card perforating device, a keyboard adapted to be shifted to one of three positions, a manually controlled means for alternately shifting from one extreme position to a central position, an electrically controlled means for alternately shifting from said central position to the other extreme position, and means for disabling said manual means when said keyboard is in said second extreme position.

11. In a card perforating device, a keyboard adapted to be shifted to one of three positions, a manually controlled means for alternately shifting from one extreme position to a central position, an electrically controlled means for alternately shifting from said central position to the other extreme position, and means for opening the circuit to said electrically controlled means when said keyboard is in said first extreme position to disable said electrical means.

12. In a machine of the class described, an armature under the control of a pair of magnets, means controlled by said armature for effecting a keyboard shift, said means being adapted to close contacts to prepare operating circuits for both of said magnets and to open one of said circuits and close the other at a second set of contacts.

13. In a machine of the class described, an armature under the control of a pair of magnets, means associated with said armature for effecting a keyboard shift, said means being adapted to actuate contacts for opening an operating circuit to each of said magnets and additional means associated with said means for controlling a second pair of contacts to open the operating circuit to one magnet before preparing the operating circuit to the other of said magnets.

14. In an electrical perforating device, a shiftable keyboard, a circuit for controlling the shifting of said keyboard, a plurality of punches, a plurality of slides and a hammer bail associated with said punches, a second circuit for controlling the operation of said slides and bail, a pair of contacts one in each of said circuits, and an arm operated by said slides to concomitantly open one pair of said contacts to render said first circuit ineffective and the second effective thereby preventing the shifting of the keyboard during the actuation of said slides.

15. In a machine of the class described, a keyboard shiftable to three positions, a plurality of keys in said keyboard, a plurality of wires directly operable by said keys, and means for operating a different wire or combination of said wires with each one of said keys in each position of said keyboard.

16. In a machine of the class described, a shiftable keyboard, means comprising an electric circuit for shifting said keyboard, and a latch and a pawl controlling the operation of a contact in said circuit, to permit only one shift of said keyboard at each operation of said contact.

17. In a machine of the class described, a transversely shiftable keyboard, a plurality of keys in said keyboard, a plurality of wires directly operable by said keys, a lever and a lock mounted on said keyboard, and an arm operable by said lever to effect shifting of said keyboard, said arm being retained in shifted position by said lock.

18. In a machine of the class described, a plurality of punches, a ball lock mechanism, a punch selector including a slide consisting of two portions, one of said portions being operatively associated with said lock mechanism, means for operating the other portion of said slide independently of said first portion whereby operation of said lock mechanism is not effected, and a second means for operating both portions simultaneously for effecting operation of said lock mechanism.

19. In a card perforating device, a reciprocating carriage, an escapement mechanism associated therewith comprising a rack controlled by a pair of pawls, means for disengaging one of said pawls from said rack, two individual means for maintaining said pawl disengaged, said means comprising a ball detent cooperating with a hooked lever engaging a pin on said pawl and a Bowden wire connection from a manually operated key to a pin engaging a portion of said pawl, and additional means for engaging said pawl with said rack at a predetermined position of said carriage, said means comprising a stop on the carriage engaging an extended portion of said pawl, each of said means operating independently of the other.

20. In a card perforating device a reciprocating carriage, an escapement mechanism associated therewith comprising a rack controlled by a pair of pawls, a key controlled means for disengaging and holding one of said pawls disengaged and means on said carriage for reengaging said pawls with said rack, said means comprising a lug on said carriage engaging an extended portion of said pawl, said pawl being adapted to restore said key controlled means to normal.

21. In a card perforating device, a reciprocating carriage, an escapement mechanism associated therewith comprising a rack controlled by a ratchet pawl and a holding pawl, a key controlled means for disengaging and holding said ratchet pawl disengaged from said rack, and means on said carriage for reengaging said ratchet pawl with said rack, said means comprising a lug on said carriage engaging an extended portion of said pawl, said pawl in turn restoring said key operated means to normal.

EDWIN ROGGENSTEIN.